United States Patent
Rao (10) Patent No.: US 8,260,839 B2
(45) Date of Patent: Sep. 4, 2012

(54) MESSENGER BASED SYSTEM AND METHOD TO ACCESS A SERVICE FROM A BACKEND SYSTEM

(75) Inventor: Harish Rama Rao, Karnataka (IN)

(73) Assignee: SAP AG, Walldorf (DE)

( * ) Notice: Subject to any disclaimer, the term of this patent is extended or adjusted under 35 U.S.C. 154(b) by 424 days.

(21) Appl. No.: 11/778,101

(22) Filed: Jul. 16, 2007

(65) Prior Publication Data

US 2009/0024705 A1    Jan. 22, 2009

(51) Int. Cl.
*G06F 15/16* (2006.01)
(52) U.S. Cl. ......... 709/201; 709/202; 709/204; 709/206
(58) Field of Classification Search .................. 709/201, 709/202, 204, 206
See application file for complete search history.

(56) References Cited

U.S. PATENT DOCUMENTS

| | | | |
|---|---|---|---|
| 6,446,115 B2 * | 9/2002 | Powers | 709/206 |
| 6,564,247 B1 * | 5/2003 | Todorov | 709/206 |
| 7,356,803 B2 * | 4/2008 | Bau et al. | 717/116 |
| 2003/0005181 A1 * | 1/2003 | Bau et al. | 709/330 |
| 2004/0153512 A1 * | 8/2004 | Friend | 709/206 |
| 2005/0198159 A1 * | 9/2005 | Kirsch | 709/206 |
| 2005/0204002 A1 * | 9/2005 | Friend | 709/206 |
| 2007/0011252 A1 * | 1/2007 | Taylor | 709/206 |
| 2007/0011253 A1 * | 1/2007 | Taylor | 709/206 |
| 2007/0038718 A1 * | 2/2007 | Khoo et al. | 709/206 |
| 2008/0215687 A1 * | 9/2008 | Madnani | 709/206 |
| 2009/0024705 A1 * | 1/2009 | Rama Rao | 709/206 |

* cited by examiner

*Primary Examiner* — Brian P Whipple
*Assistant Examiner* — Keyvan Emdadi (57) ABSTRACT

What is described is a system and method for accessing a backend service. The method includes receiving a message at a client; parsing the message into parts of the message using a natural language processor; interpreting the parts of the message; identifying a service and a backend system based on the interpreted parts of the message; and invoking the service from the backend system.

20 Claims, 7 Drawing Sheets

MESSENGER BASED SYSTEM AND METHOD TO ACCESS A SERVICE FROM A BACKEND SYSTEM

FIELD OF THE INVENTION

This invention generally relates to a backend service. More particularly, the invention relates to a messenger based system and method to access a service from a backend system.

BACKGROUND OF THE INVENTION

Many computer systems include components that can be characterized as a backend system and frontend, respectively. Typically, the backend stores and processes data, among other services, and the frontend is responsible for presenting the backend data and allowing users to manipulate the data when applicable. For example, the R/3 system from SAP AG is a backend system that is capable of handling many different types of data processing and management services in an enterprise resource planning (ERP) environment, such as services related to customer relationship management (CRM). Moreover, SAP AG provides a business warehouse (BW) system that offers data repository management services that can be used in connection with the backend system. For example, the BW system lets users formulate queries that can be run on various data repositories of backend data. The BW server also provides visual displays for presenting query results in formats that are most suitable for the various users of the system. These visual displays that present operational data to a user may be referred to as reports, because they are akin to a traditional paper-based business report.

One disadvantage with the mentioned existing systems and other backend systems is that the report displayed to the user rarely has any useful connection to operational data in the backend. That is, if the user intends to go to the source for the report data, these systems seldom provide a convenient user navigation to the source data. For example, when the user is looking at a particular table in a report generated by a data repository management service, there is no convenient way for the user to navigate to the backend source data that was used in creating the table. Rather, the user has to identify the proper backend service that handles the operational data, and access the backend system to launch that service. Moreover, it may be necessary for the user to know navigation path of the service in the backend system and object key to access the data in the backend system.

The user may face similar problems when the user initiates a session for accessing a service and performing a task. The user usually accesses a service via a web interface, or an backend application login. However, in case of the web interface, the user needs to know uniform resource locator (URL) of the service. Moreover, in case of the backend application login, a client of backend application has to run on user system and the user needs to know the backend system. In addition, with both the web interface and backend application login, the user typically has to know the service to be used and also navigation path of the service.

SUMMARY OF THE INVENTION

What is described is a system and method for accessing a backend service. The method includes receiving a message at a client; parsing the message into parts of the message using a natural language processor; interpreting the parts of the message; identifying a service and a backend system based on the interpreted parts of the message; and invoking the service from the backend system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
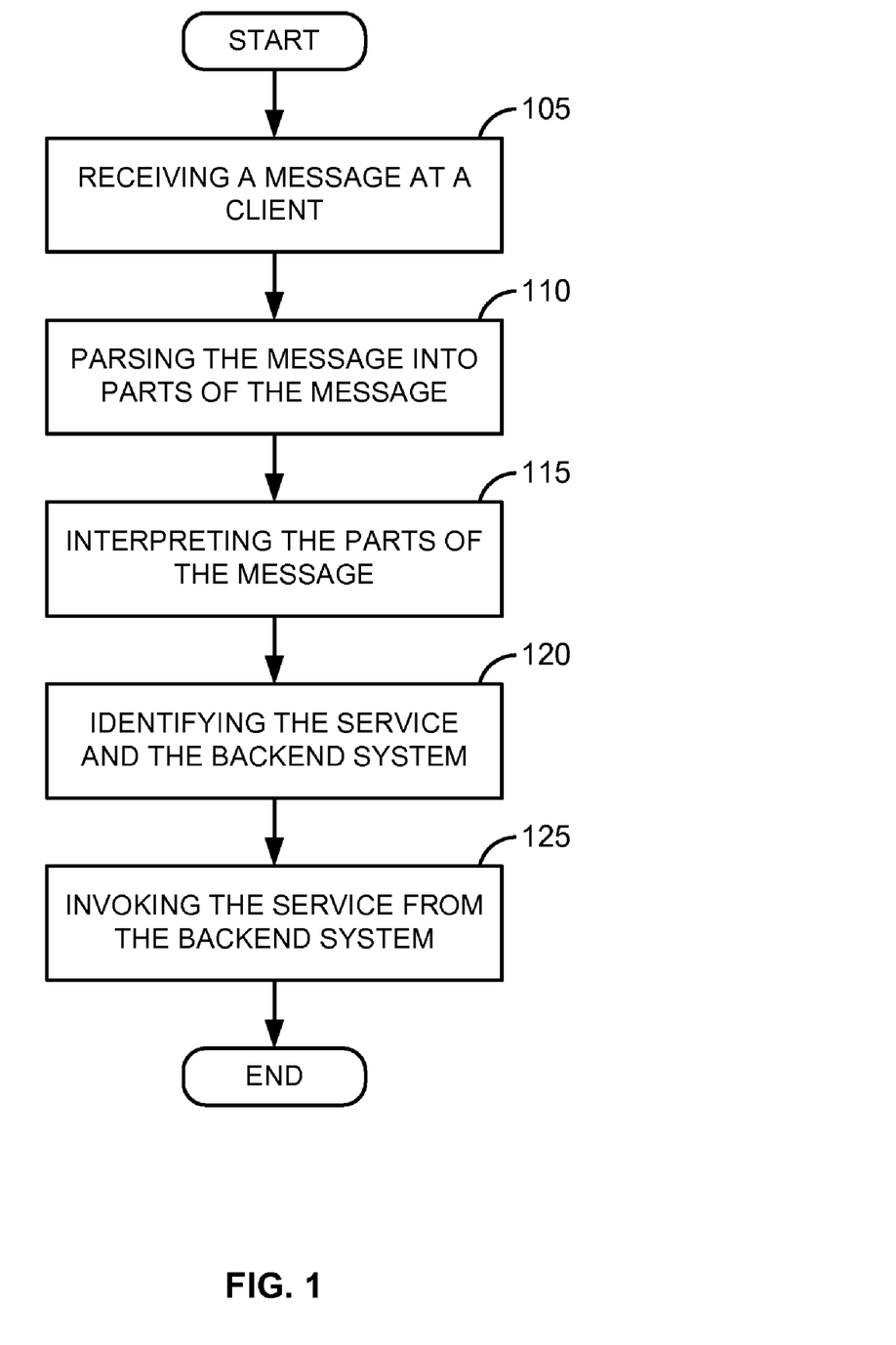
FIG. 1 illustrates a messenger based method to access a service from a backend according to an embodiment of the invention.
Figure 2A:
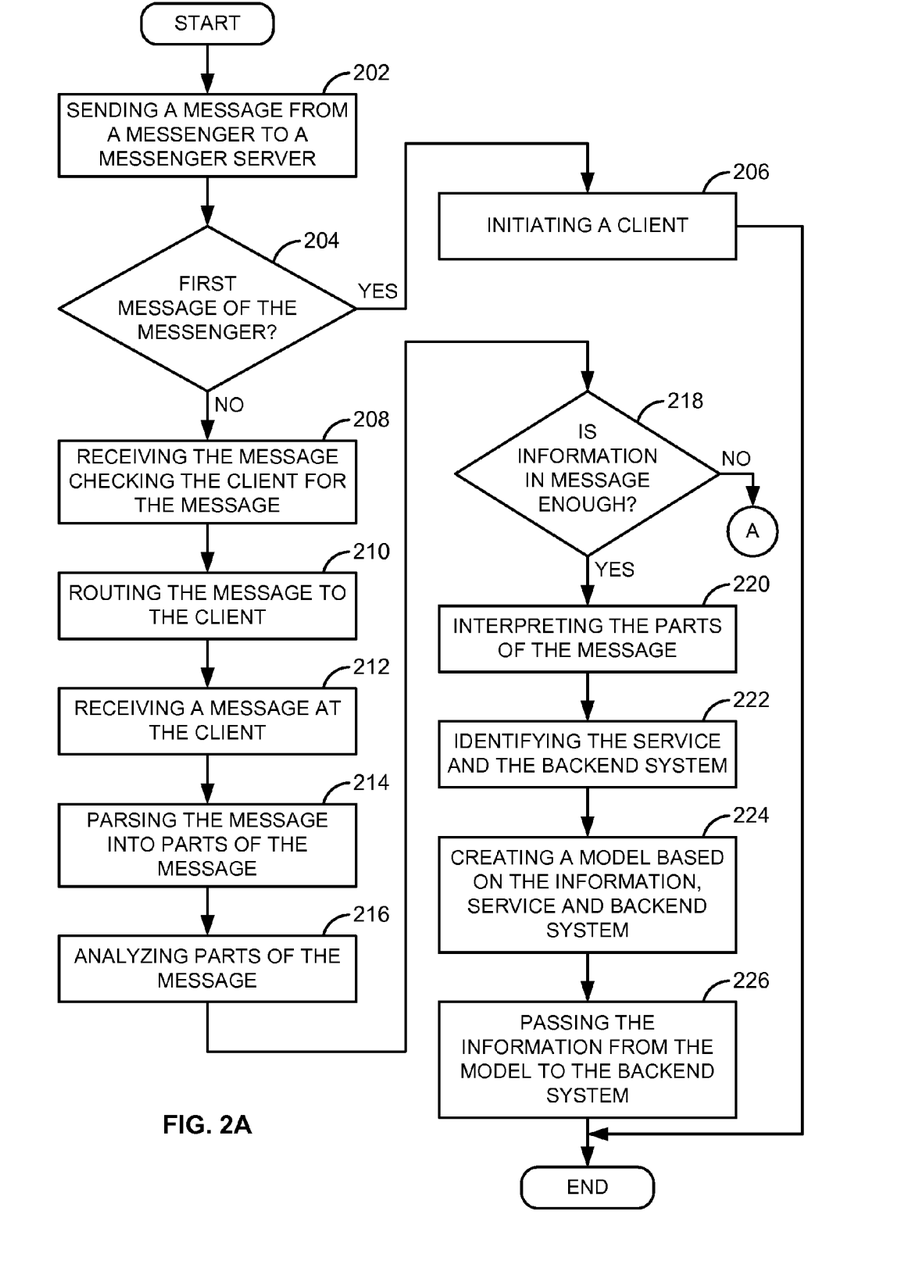
FIG. 2a illustrates first part of a messenger based method to access a service from a backend according to another embodiment of the invention.
Figure 2B:
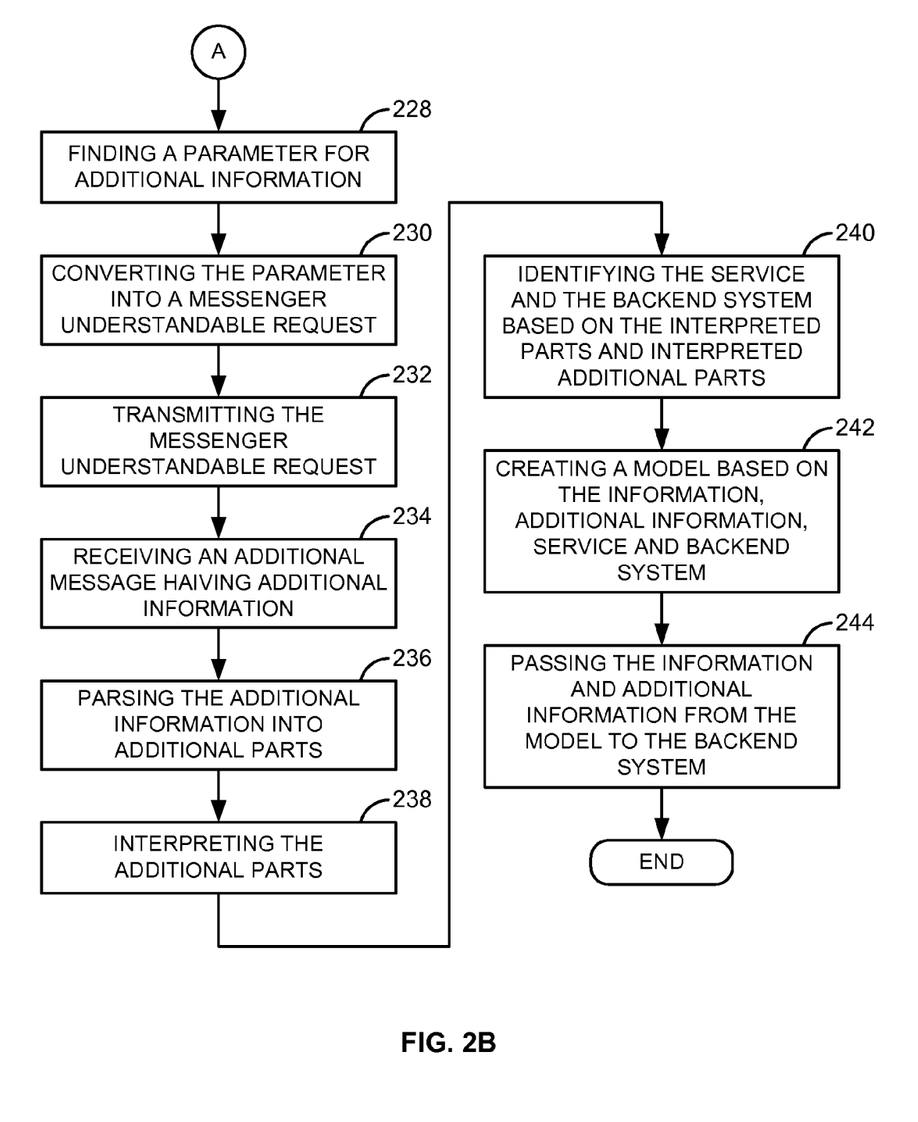
FIG. 2b illustrates second part of a messenger based method to access a service from a backend according to another embodiment of the invention.

FIG. 1, FIG. 2a and FIG. 2b illustrate different embodiments of a messenger based method for accessing a service from a backend system. Referring initially to FIG. 1, at 105, a message is received at a client. At 110, the message is parsed into parts of the message using a natural language processor and at 115, the parts of the message are interpreted. Based on the interpreted parts of the message, at 120, a service and a backend system is identified. At 125, the service is then invoked from the backend system.

The message includes a text, graphical and voice format messages. The message also includes other formats, which may be parsed into parts of the message. The natural language processor (NLP) may include a grammatical rule based NLP, and a statistical NLP. The NLP includes processing features such as summarization, language reading, language writing, information extraction, information retrieval, machine translation, natural language generation, optical character recognition, question answering, text simplification, text to speech conversion, text proofing, speech segmentation, text segmentation, word sense disambiguation, syntactic disambiguation, and imperfect input recognition.

The parsing divides the message into different parts. For example, for a text message, the parts will include words of the text message. The interpretation of the parts creates a dependency among parts of the message. Parts of the message, when received, have little dependencies with other parts. For example, part of the message that is an adjective has little meaning without an attachment to another part, which is an appropriate head noun. Based on relation between parts, during interpretation, each part of the message associates itself to a corresponding other part of the message. For example, in a text message, the association is based on words in a language, which are commonly used and comparing such words with parts of the text message. The interpretation allows communication of identity, which defines section of speech such as noun, adjective, verb, of the parts to other parts within the message. The relation of a part with other parts within the context of the message is estimated. A database maintains a large sample of parameters for possible service and backend system is maintained. In one of the embodiments, the database includes business specific dictionaries such as a dictionary for enterprise resource planning and a separate dictionary for customer relationship management. Based on the estimation and information in the parts, the identification is made by comparing the parts of the message with the parameter of services and backend system stored in the database. If a match is found, the matched service and matched backend system are the identified service and the backend system.

The backend system typically stores and processes data. For example, the R/3 system from SAP AG is a backend system that is capable of handling many different types of data processing and management service in an enterprise resource planning (ERP) environment, such as services related to customer relationship management (CRM). Similarly, SAP AG provides a business warehouse (BW) system that offers data repository management services that can be used in connection with the backend system. For example, the BW system lets users formulate queries that can be run on various data repositories of backend data. The BW server also provides visual displays for presenting query results in formats that are most suitable for the various users of the system. Furthermore, services may include web services and the backend system may include web based backend systems as well. In another embodiment, this method is applicable for remote function (RFC) calls as well. RFCs are application program interfaces to R/3 systems of SAP AG. R/3 is a set of integrated business applications from SAP AG. R/3 uses the client/server model and provides the ability to store, retrieve, analyze, and process corporate data for financial analysis, production operation, human resource management, and other business processes. This method may be used to access any R/3 system, which is exposed to a non-R/3 system.

FIG. 2a illustrates additional details of first part of the method according to another embodiment of the invention. At 202, a messenger sends a message to a messenger server. The messenger may include an instant messenger for real time communication. The messenger may also include electronic mail messenger for non real time communication. The messenger runs on a computing device having a particular processing and memory capabilities such as a mobile phone, a laptop, and a personal computer. The messenger server includes a centralized location for the exchange of information for routing the message. The messenger server and the client may be on different physical boxes or may be logically different but in the same box. The messenger server handles different type of messages from different computing devices such as short text, voice messages, and graphical messages from a mobile phone, personal digital assistant, laptop, personal computer and from other such systems.

At 204, a determination is made if the message is first message of the messenger. If so, then at 206, a client is initiated in a message processing engine. The client is an instance of the messenger in the message processing engine. At 208, a messenger server receives the message and checks the client for the message. At 210, the messenger server routes the message to the client. At 212, the message is then received at the identified client of the message processing engine. At 214, the message is parsed into parts of the message. At 216, the parts of the message are analyzed by comparing the parts of the message with a large sample of parameters for possible service and backend system, as contained in the database, which includes business specific dictionaries such as a dictionary for enterprise resource planning and a separate dictionary for customer relationship management. The parameter includes condition and field for which information has to be provided for identification of the service and the backend system. At 218, a determination is made if information in the part of the message is sufficient to identify a service and a backend system. If so, then at 220 the parts are interpreted and at 222, a service and a backend system are identified. At 224, a model based on the information, identified service and identified backend system is created. At 226, the information is passed from the model to the service in the backend system.

FIG. 2b illustrates additional details of second part of the method according to another embodiment of the invention. If at 218 (Refer FIG. 2a), the information is not sufficient to identify the service and the backend system, then at 228, a parameter is found for additional information. If this parameter is not directly detectable then a message processing engine enters into a more conversation mode where it will pose more generic words that may be related to the topic under discussion and then provokes the messenger to provide inputs that may be present in the dictionary. This is the conversation mode. This is done by finding the parameter for which the information is not provided in the message. The additional information may be used with the information to identify the service and the backend system. At 230, the parameter is converted into a messenger understandable request, which is then transmitted to the messenger at 232. The natural language processor converts the parameter into the messenger understandable request by associating the parameter with relevant section of speech such as noun, adjective, verb, and in relevant format such as text, graphical and voice. Once the service has been identified then there may be need to get direct values for the parameters required by the service and then the message processing engine will pose questions to get the values for the parameters. This is the data collection mode. Based on the request, the messenger sends an additional message having the additional information. At 234, the additional message is received at the client. At 236, the additional message is parsed into additional parts of the additional message, wherein the additional parts represent the additional information. At 238, the additional parts are interpreted and based on the interpreted parts of the message and the interpreted additional parts of the additional message, at 240, the service and the backend system are identified. At 242, a model based on the information, additional information, identified service and identified backend system is created. At 244, the information and the additional information are passed from the model to service in the backend system.

In another embodiment of the invention, if the information and the additional information are not sufficient to identify the service and the backend system, then a further parameter is found for further information to enable identification of the service and the backend system. If this parameter is not directly detectable then the system enters into the conversation mode where the message processing engine will pose more generic words that may be related to the topic under discussion and then provokes the user to provide inputs that may be present in the dictionary. This is the conversation mode. As explained earlier, this further parameter is converted into a further messenger understandable request. A further message with the further information is received at the client and parsed into further parts of the further message. The further parts are then interpreted. The interpreted parts, interpreted additional parts and interpreted further parts are used to identify the service and the backend system.

In above mentioned embodiment of the invention, the information is passed to the identified service in the identified backend system and the information updates the information in the service for a user.

In another embodiment of the invention, based on the information passed from the model to the backend system, the identified service is launched.

Figure 3:
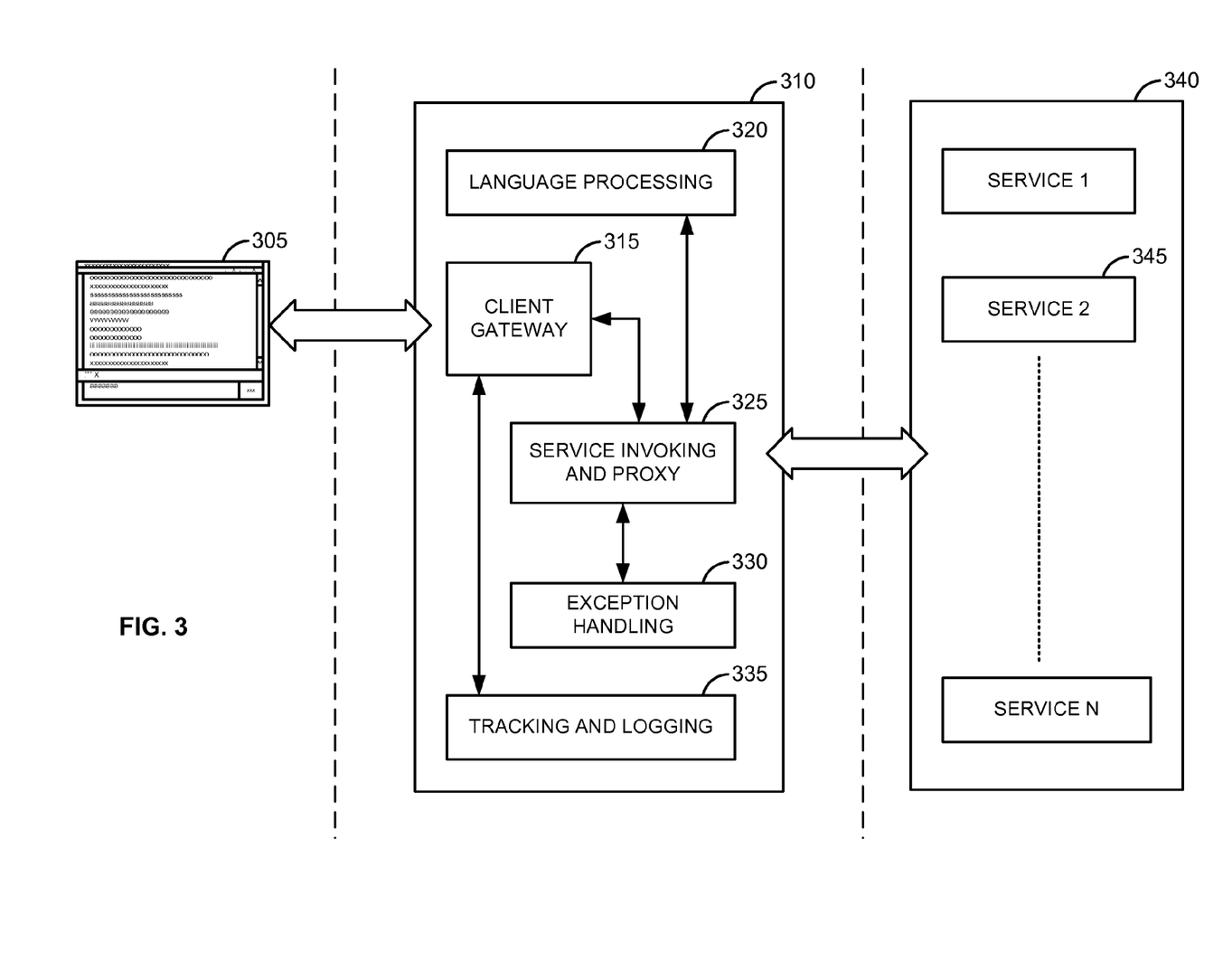
FIG. 3 illustrates functional architecture of a messenger based system to access a service from a backend according to an embodiment of the invention.

FIG. 3 illustrates a functional architecture of a messenger based system for accessing a backend service according to an embodiment of the invention. A messenger 305 sends a message to a message processing engine 310. The message processing engine includes a client gateway 315, which is connected to a tracking and logging unit 335. The tracking and logging unit 335 determines if the message is first message from the messenger 305. If so, the client gateway 315 initiates a client in the message processing engine 315. In addition, tracking and logging unit 335 also tracks status of connectivity, activity of the messenger and communication of the messenger 305 with the message processing engine 310. The message received at the client gateway 315 is sent to a language processing unit 320. The language processing unit 320 parses the message into parts of the message. The parts are then interpreted by the language processing unit. The interpreted parts are then used to identify a service and a backend system. The client gateway sends the identified service and the backend system to a service invoking and proxy unit 325, which creates a model based on information contained in the message, the identified service and backend system. The service invoking and proxy sets a connection with the identified backend system 340 and passes on the information from the model to the identified service (say to Service2 345) in the identified backend system.

Figure 4:
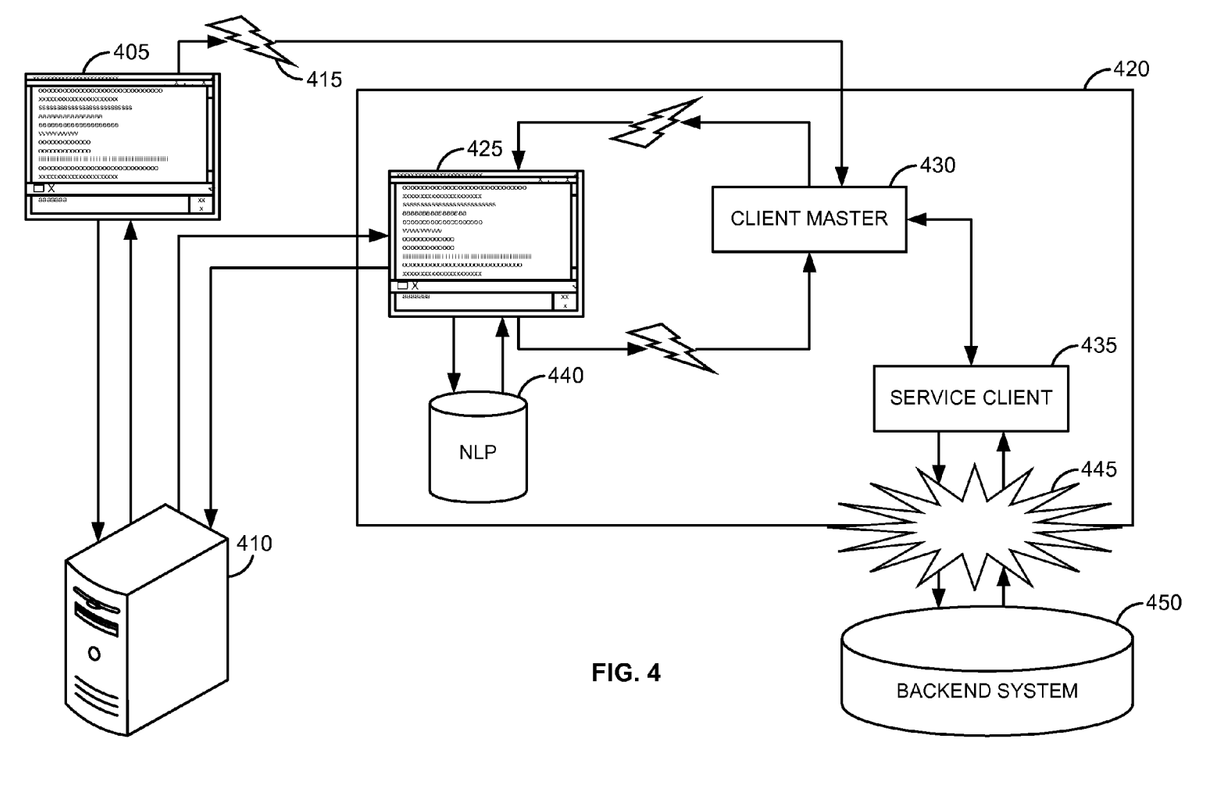
FIG. 4 illustrates architecture of a messenger based system to access a service from a backend according to an embodiment of the invention.

FIG. 4 illustrates architecture of a messenger based system to access a backend service according to an embodiment of the invention. A listener 415 creates an instance of the messager 405 as a client 425 in a message processing engine 420. The messenger 405 sends a message to a messenger server 410. The listener 415 determines if the message is first message from the messenger. If so, a client master 430 in a message processing engine 310 initiates the client 425. The message is checked for a destination in the messenger and is routed to the client 425. The client receives the message and sends the message to a natural language processor 440. The natural language processor parses the message into parts of the message. The parts of the message are interpreted and the interpreted parts are sent to the client master via the client. The client master analyzes if the information in the interpreted parts of the message is sufficient to identify a service and a backend system. If so, then, the identified service 445 is invoked from the identified backend system 450 using a service client 435. The invoking of the service includes the service client creating a model based on the information contained in the parts, the identified service and the backend system. Thereafter, the information is passed from the model to the identified service 445 in the identified backend system 450.

In another embodiment of the invention, if the client master 430 analyzes that the information in the interpreted parts is not sufficient to identify a service, the client master 430 finds a parameter for additional information. If the client master cannot find the right parameter, the client master will propose a generic group of words which are syntactically related to the topic and prompts the user to provide an additional information. The additional information may be used with the information to identify a service and a backend system. The client master 430 converts the parameter into a messenger understandable request, which is then transmitted to the messenger 405 using a transmitter. If the parameter is not directly detectable then the client master 430 enters into a conversation mode where the message processing engine poses more generic words that may be related to the topic under discussion and then provokes the user to provide inputs that may be present in the dictionary. This is the conversation mode.

Based on the request, the messenger receives the messenger understandable request and provides additional information as an additional message. The additional message is received at the client 425 and is sent to the natural language processor 440. The natural language processor 440 parses the additional messages into additional parts of the additional message. The natural language processor 440 further interprets the additional parts and sends the interpreted additional parts to the client master 430 via the client 425. Based on the interpreted parts of the message and the interpreted additional parts of the additional message, the client master 430 identifies a service and a backend system. The identified service, backend system along with the information and the additional information is sent to the service client 450. Based on the identified service, backend system, information and the additional information, the service client 435 creates a model. The service client 430 then passes the information and the additional information from the model to the identified service 435 in the identified backend system 450.

Figure 5:
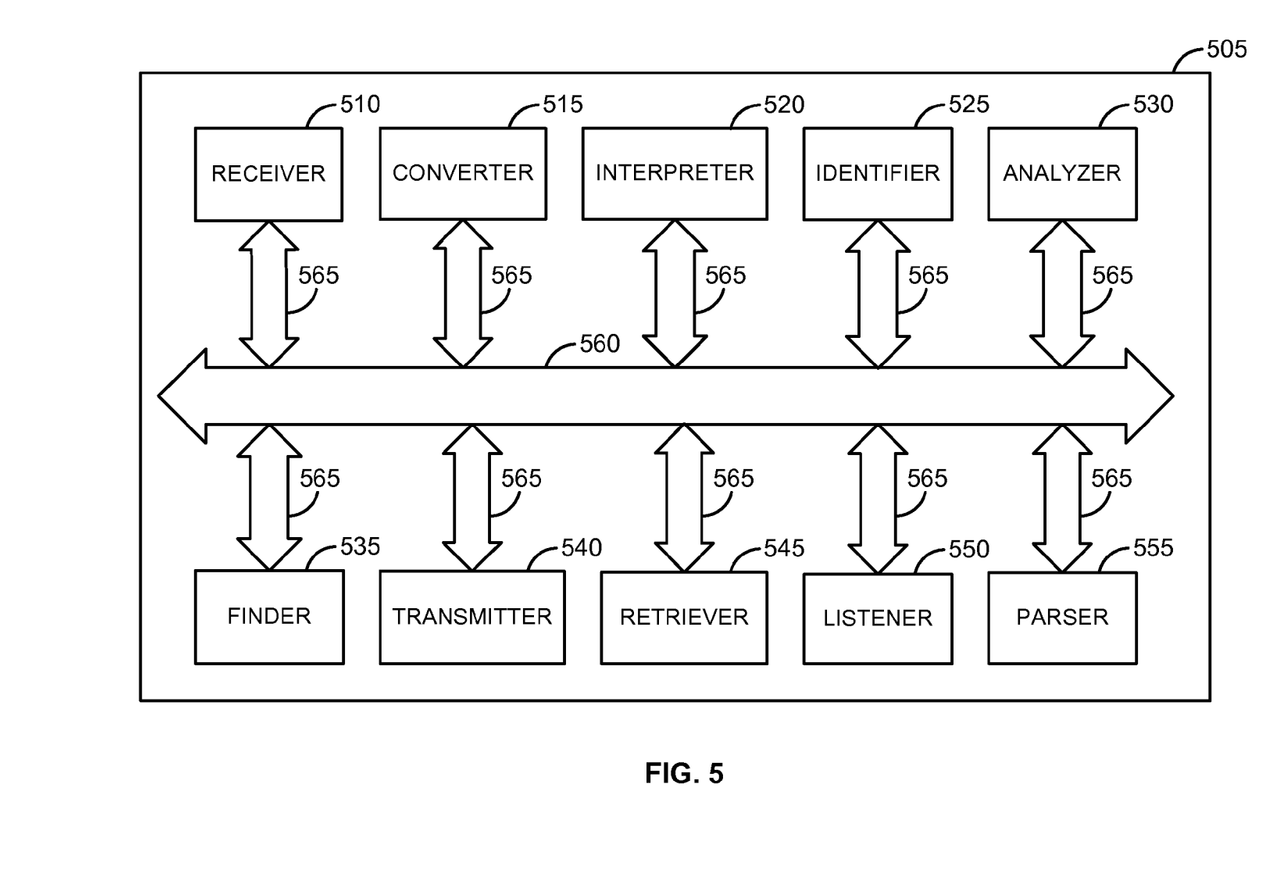
FIG. 5 illustrates architecture of a message processing engine according to an embodiment of the invention.

FIG. 5 illustrates architecture of a message processing engine according to an embodiment of the invention. The message processing engine 505 includes components such as natural language processor 440, client 425 and client master 430 (refer FIG. 4). In another embodiment, the message processing engine may include the service client also. The natural language processor, client and client master include sub-components. The sub-component includes a receiver 510 to receive a message, a parser 555 to parse the message into parts of the message, an interpreter 515 to interpret the parts of the message. The sub-components also include an analyzer 525 to analyze if the information in the message is sufficient to identify the service and the backend system. If the information is sufficient to identify the service and the backend system, then an identifier 520 identifies the service and the backend system based on the interpreted parts of the message.

However, if the information is not sufficient, a finder 530 finds a parameter for additional information. The additional information may be used with the information to identify a service and a backend system. A converter 535 converts the parameter into a messenger understandable request, which is then transmitted to the messenger using a transmitter 540. If the parameter is not directly detectable then the client master 430 enters into a conversation mode where the message processing engine poses more generic words that may be related to the topic under discussion and then provokes the user to provide inputs that may be present in the dictionary. This is the conversation mode. An additional message is received from the messenger at the receiver 510. The parser 555 parses the additional message having the additional message into parts of the additional message. The interpreter 515 interprets the parts of the additional message. Thereafter, based on the additional information and information, the identifier 520 identifies the service and backend system. Those skilled in the art will recognize that many other embodiments with respect to structure of the message processing engine is possible such as including a few functionalities of the client master in the natural language processor and fully within the scope and spirit of this disclosure. Different sub-components may be connected and communicates through communication channels 560 and 565 respectively.

Figure 6:
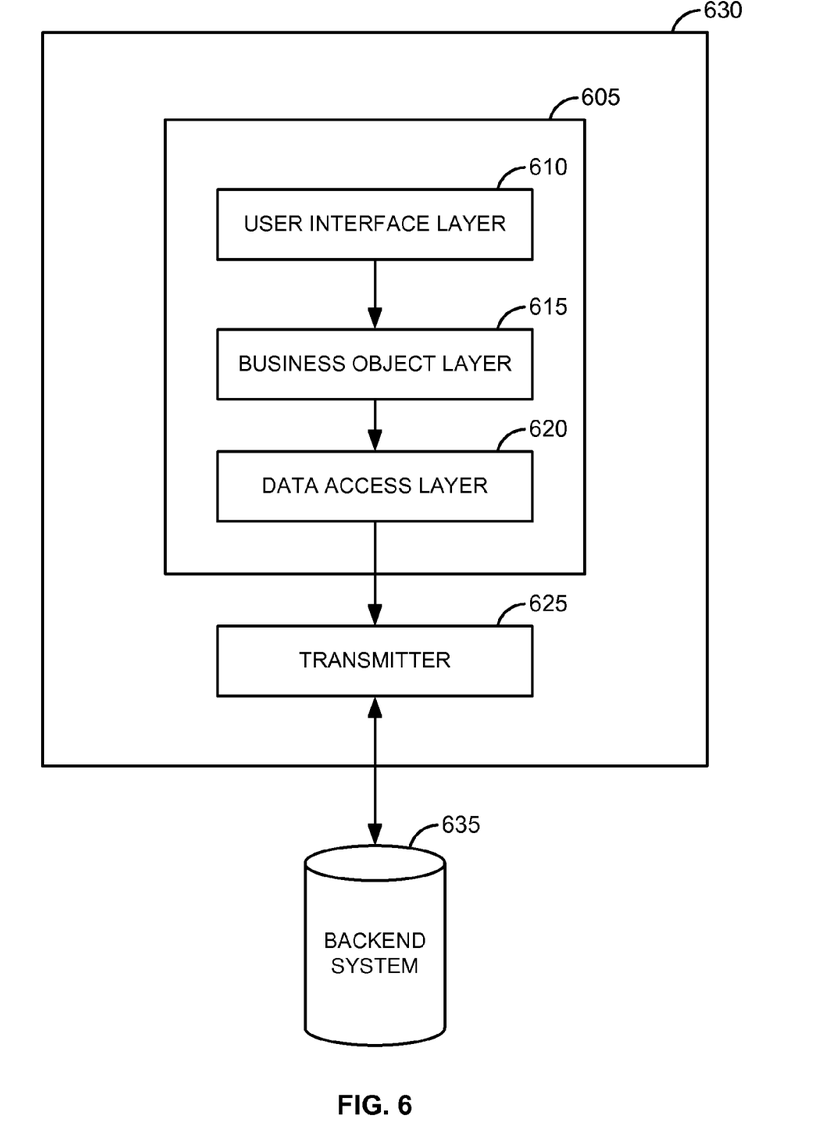
FIG. 6 illustrates architecture of a service client according to an embodiment of the invention.

FIG. 6 illustrates architecture of a service client according to an embodiment of the invention. The service client 630 includes a modeler 605 and a transmitter 625. The modeler includes a user interface (UI) layer 610, a business object layer 615 and a data access layer 620. In general, the layers provide for separation and modularization of functionalities and services. These services are integrated into a single service via common interfaces that allow data to be exchanged between any two layers. For example, the business object layer 615, which is used in part to define a model containing the information with functionality, structure and logic of a service, exists independently from UI layer 605, which provides functionality for displaying a user interface. Since different computing devices have varying degrees of capabilities with respect to the various functionalities associated with the layers, the service client 630 allows for flexible adaptation of the service to accommodate the capabilities of various devices.

The UI layer 610 provides functionality for presenting a computing device with a graphical user interface. For example, according to one embodiment, user interface layer may include a plurality of hypertext markup language (HTML) or extensible markup language (XML) pages, which are fetched via a browser resident on the user computing device and presented to the user. The UI layer 610 may include an interaction layer, which provides functionality for responding to interactions between the client master (425, Refer FIG. 4) and the UI layer 610.

Business object layer 615 includes functionality for the core business logic underlying the service to be invoked. According to one embodiment of the present invention, a model is created through the information as provided by the client master (425, Refer FIG. 4). The model provides abstraction of an underlying backend database 340 and thereby facilitates invoking of the service to include common notions of business entities. Among other functions, business object layer 615 may perform validations of data entered using the messenger (305, Refer FIG. 4). Additionally, a processing layer may exist between the business object layer and the UI layer. The natural language processor, the client master the interpreter reside in the processing layer.

Data access layer 620 provides functionality via a transmitter 625 for interactions with backend system 635. The data access layer 615 provides an interface to relate particular model containing information with corresponding web service managed fields in the backend system 340. The information contained in the model created by the BO layer 615 is transmitted suing the functionalities of data access layer 620 and the transmitter 625.

Other embodiments of the invention may be implemented in digital electronic circuitry, or in computer hardware, firmware, software, or in combinations of them.

Elements of the invention may also be provided as a machine-readable medium for storing the machine-executable instructions. The machine-readable medium may include, but is not limited to, Flash memory, optical disks, CD-ROMs, DVD ROMs, RAMs, EPROMs, EEPROMs, magnetic or optical cards, propagation media or other type of machine-readable media suitable for storing electronic instructions.

Throughout the foregoing description, for the purposes of explanation, numerous specific details were set forth in order to provide a thorough understanding of the invention. It will be apparent, however, to one skilled in the art that the invention may be practiced without some of these specific details.

The underlying principles of the invention may be employed using a virtually unlimited number of different types of input data and associated actions.

Accordingly, the scope and spirit of the invention should be judged in terms of the claims which follow.

What is claimed is:

1. A method comprising:
receiving a message at a client, the message including a message body;
parsing the message body into parts of the message body using a natural language processor, wherein a first part of the message body is associated with a second part of the message body;
comparing the parts of the parsed message body with a parameter to determine whether information provided in the parts is sufficient to identify a service and a backend system to process the message body, wherein the parameter includes a condition and a field for the identification of the service and the backend system;
requesting additional information to identify the service and the backend system included in an additional message body if the information provided in the parts of the message body is not sufficient to identify the service and the backend system, the additional information requested in a conversation mode and provided with a second parameter;
interpreting the parts of the message body;
identifying the service and the backend system to process the message body based on the interpreted parts of the message body;
creating a model based on the information, the additional information, the identified service, and the identified backend system; and
invoking the service to process the message body from the backend system based on the information and the additional information from the created model.

2. The method of claim 1, further comprising:
receiving the additional message body having the additional information at the client based on the requesting;
parsing the additional message body into additional parts representing the additional information;
interpreting the additional parts of the additional message body;
identifying the service and the backend system based on the interpreted parts and the interpreted additional parts; and
intimating a messenger of results of invocation of the services.

3. The method of claim 2, wherein the requesting comprises:
finding the second parameter for the additional information;
converting the second parameter into a messenger understandable request if the parameter is available;
providing the messenger with generic words related to the message body and requesting additional information if the second parameter is not available; and
transmitting the messenger understandable request to the messenger.

4. The method of claim 1, further comprising:
passing the information and the additional information from the model to the identified service in the identified backend system; and
updating the identified service with the passed information and additional information from the model.

5. The method of claim 1, further comprising:
sending the message using a messenger to a messenger server;
checking the client at the messenger server for the message; and
routing the message to the client.

6. The method of claim 1, further comprising:
identifying a new messenger connection; and
intiating the client when the messenger sends a first message.

7. The method of claim 1, wherein the message is selected from a group consisting of a text, a graphical, and a voice message.

8. The method of claim 1, wherein the parsing includes summarization, language reading, language writing, information extraction, information retrieval, machine translation, natural language generation, optical character recognition, question answering, text simplification, text to speech conversion, text proofing, speech segmentation, text segmentation, word sense disambiguation, syntactic disambiguation, and imperfect input recognition.

9. An article of manufacture, comprising:
a tangible, non-transitory machine readable medium comprising instructions, which when executed by a machine, causes the machine to:
receive a message at a client, the message including a message body;
parse the message body into parts of the message body using a natural language processor, wherein a first part of the message body is associated with a second part of the message body;
compare the parts of the parsed message body with a parameter to determine whether information provided in the parts is sufficient to identify a service and a backend system to process the message body, wherein the parameter includes a condition and a field for the identification of the service and the backend system;
request additional information to identify the service and the backend system included in an additional message body if the information provided in the parts of the message body is not sufficient to identify the service and the backend system, additional information requested in a conversation mode and provided with a second parameter;
interpret the parts of the message body;
identify the service and the backend system to process the message body based on the interpreted parts of the message body;
create a model based on the information, the additional information, the identified service, and the identified backend system; and
invoke the service to process the message body from the backend system based on the information and the additional information from the created model.

10. The medium of claim 9, wherein the machine readable medium provides instructions, which when executed by the machine, causes the machine to:
receive the additional message body having the additional information at the client based on the requesting;
parse the additional message body into additional parts representing the additional information;
interpret the additional parts of the additional message body;
identify the service and the backend system based on the interpreted parts and interpreted additional parts; and
intimate a messenger of a result of invocation of the service.

11. The medium of claim 10, wherein the machine readable medium provides instructions, which when executed by the machine, causes the machine to:
find the second parameter for the additional information;
convert the second parameter into a messenger understandable request if the parameter is available;
provide the messenger with generic words related to the message body and to request additional information if the second parameter is not available; and
transmit the messenger understandable request to the messenger.

12. The medium of claim 9, wherein the machine readable medium provides instructions, which when executed by the machine, causes the machine to:
pass the information and the additional information from the model to the identified service in the identified backend system; and
update the identified service with the passed information and additional information from the model.

13. The medium of claim 9, wherein the machine readable medium provides instructions, which when executed by the machine, causes the machine to:
send the message using a messenger to a messenger server;
check the client at the messenger server for the message; and
route the message to the client.

14. The medium of claim 9, wherein the machine readable medium provides instructions, which when executed by the machine, causes the machine to:
identify a new messenger connection; and
intiate the client when the messenger sends a first message.

15. A system comprising:
a client unit to receive a message, the message including a message body;
a parser unit to parse the message body into parts of the message body using a natural language processor, wherein a first part of the message body is associated with a second part of the message body;
an analyzer unit to compare the parts of the parsed message body with a parameter to determine whether information provided in the parts is sufficient to identify a service and a backend system, wherein the parameter includes a condition and a field for the identification of the service and the backend system;
a finder unit to find a second parameter for additional information to identify the service and the backend system if the information provided in the parts of the message body is not sufficient by entering into a conversation mode;
an interpreter unit to interpret the parts of the message;
an identifier unit to identify the service and the backend system to process the message body based on the interpreted parts;
a model unit to create a model based on the information, the additional information, the identified service, and the identified backend system; and
a service client unit to invoke the service to process the message body from the backend system based on the information and the additional information from the model.

16. The system of claim 15, wherein the client unit comprises:
a converter unit to convert the second parameter into a messenger understandable request; and a transmitter unit to transmit the messenger understandable request and to intimate a messenger of a result of invocation of the service to the messenger.

17. The system of claim 16, wherein:

the client unit receives an additional message body having the additional information;

the parser unit parses the additional message body into additional parts representing the additional information;

the interpreter unit interprets the additional parts of the additional message body; and the identifier unit identifies the service and the backend system based on the interpreted parts and the interpreted additional parts.

18. The system of claim 15, wherein the service client unit comprises:

a transmitter unit to pass the information and the additional information from the model to the identified service in the identified backend system; and an update unit to update the identified service with the passed information and the additional information from the model.

19. The system of claim 15, further comprising:

a messenger unit to provide a message to the client unit;

a messenger unit server to check the client unit for the message; and a router unit to route the message to the client unit.

20. The system of claim 15, wherein the client unit comprises:

a listener unit to identify a new messenger connection; and a client master unit to initiate the client unit when a new user sends a first messenger.

* * * * *